UNITED STATES PATENT OFFICE 2,571,983

PROCESS OF PURIFYING MAGNESIA CONTAINING IMPURITIES INCLUDING IRON, MANGANESE, AND BORON

Teynham Woodward, Los Altos, Calif., assignor to Kaiser Aluminum & Chemical Corporation, a corporation of Delaware No Drawing. Application April 19, 1948, Serial No. 21,849

6 Claims. (Cl. 23—201)

This case relates to the purification of magnesia, and particularly to the removal of iron, boron and manganese from magnesia containing such impurities.

Magnesia derived from bitterns brines or seawater, or from natural deposits such as brucite, magnesite or dolomite, contains small amounts of iron, manganese and boron. The amount or proportion of each of these substances varies with the source of the magnesia and the method of treating the starting material to extract the magnesia therefrom. In the extraction of magnesia from magnesian solutions such as brines, seawater or bitterns, the solution is usually treated with calcined dolomite, or with lime, usually in the form of a slurry. The impurities hereinabove referred to may be derived from the starting solution or from the treating agent. For instance, baron is usually derived from seawater or bittern, and iron and manganese are largely derived from limestone or dolomite. Impurities of these kinds are likewise present in magnesia recovered from the natural magnesian ores mentioned above.

When magnesia or magnesium hydroxide is to be used for some purposes, particularly as a pharmaceutical or for high temperature electrical insulation, such impurities must be removed or reduced to very small amounts. It is known, for instance, that the presence of boron or its compounds is objectionable in material intended for ingestion by humans. It is also well recognized that the presence of iron in magnesia refractories or ceramics increases their conductivity of both electricity and heat. With respect to high temperature electrical insulation use, the effect of either boron oxide or of iron oxide is quite critical in lowering the resistivity coefficient of the magnesia. It has previously been proposed to remove iron and manganese from magnesia by dissolving the impure material in an acid, carefully precipitating the iron and manganese from the resulting solution as the hydroxides, and then recovering the magnesia. The re-precipitation purification of magnesia has the disadvantages of being slow and expensive, and it has the further feature, undesirable in some cases, that the magnesia so obtained has a low bulk density, for instance of around 35 to 60 pounds per cubic foot.

It has long been known, on the other hand, to make magnesium chloride from MgO by chlorinating the latter under strongly reducing conditions and at moderately elevated temperatures, i. e. at 600° C. to 1000° C., preferably from 700° C. to 900° C. In these methods, the MgO is intimately mixed with solid carbon reducing agent or treated with a strongly reducing gas in high concentrations, such as undiluted CO. It has been now found according to this invention that magnesia is purified by treatment with a chlorine-yielding gas in a slightly reducing atmosphere, at higher temperatures, that is, at from about 800° C. to about 1500° C. without substantial conversion to magnesium chloride. Chlorination for the removal of the impurities iron, manganese and boron is effected in a slightly, or moderately, reducing atmosphere, preferably in the presence of a reducing gas. In the present process, iron, manganese and boron are evidently preferentially reacted to form chlorides volatile under the conditions of operation. It is also noted that a reduction in the lime content occurs in operating the process of this invention.

The gases which are useful in this process include natural gas, gases generated by combustion of carbon or hydrocarbon fuels, and the like, which maintain slightly or moderately reducing atmospheres. The gases of combustion contain a major proportion of nitrogen and minor amounts of $CO_2$, CO and water vapor. In general, the gases preferred in this process contain minor proportions of CO, H or other reducing gas. The reducing atmosphere of use in this process can also be effected by means of carbonaceous reducing agent distributed at random through the magnesia material to be treated but in minor proportion with respect to the magnesia and not in intimate admixture therewith.

The chlorine-yielding gas useful in this invention is chlorine gas, hydrogen chloride, mixture of two or more of such gases, or the like.

In a preferred method of carrying out the process of this invention, magnesia which exhibits sufficient activity that it hydrates with added water moderately rapidly is formed into agglomerates, such as pellets, nodules or the like, with a small amount of water and allowed to hydrate and harden. The preparation of such agglomerates is described and claimed in my copending application Serial No. 557,047. Any other desired method of preparing agglomerates, lumps, pieces or granules of magnesia or hydrated magnesia can also be used. The agglomerates prepared by forming magnesia with water and hydrating are strong and suitable for charging into a furnace or a stack kiln. This strength apparently is due to the bonding effect set up by hydration of the magnesium oxide. Alternatively, brucite or magnesite can be crushed, preferably to pieces of about one-half inch to one inch size, calcined, and subjected to the chlorination treatment. In another method of working, more finely divided magnesia can be chlorinated, but for ease of control of the operation and for recovery of the purified product, treatment in the agglomerated form, or of larger pieces otherwise obtained, is preferred.

If desired, the effluent gases from the chlorination zone can be treated to recover the volatilized compounds. The treated magnesia is preferably calcined under oxidizing conditions to re-convert any magnesium chloride which may have been formed to magnesium oxide. It has been found, however, that the content of the impurities mentioned is markedly decreased by working according to the process of this invention, without effecting substantial conversion of magnesia to magnesium chloride.

It is also advantageous in some instances to introduce a small amount of an inert sweeper gas, which may be nitrogen, helium or the like, to enable removal of all of the volatile chlorides.

*Example*

Magnesia obtained by treating seawater with calcined dolomite, washing the resultant precipitate, filtering and calcining the filter cake to a medium or light burn, is mixed with a small amount of water and formed into pellets of about $\frac{5}{16}$ inch diameter and half-inch length in a pellet press. 43 lbs. of the pellets are charged into a pot furnace and fired, preferably with natural gas or butane, until the charge temperature is about 1100° C. The fire is shut off and chlorine is admitted to the base of the furnace, simultaneously with a slow steam of butane. Chlorination is continued for thirty minutes. Chlorination is then stopped and firing is resumed, the charge being fired to maximum temperature of the furnace to calcine the magnesia, for about 3 hours.

The magnesia starting material showed upon analysis a content of 0.25% $Fe_2O_3$ and 0.034% MnO; the treated magnesia showed a content of 0.035% $Fe_2O_3$ and 0.0044% MnO. These are percentages by weight, on the ignited basis. While this particular lot of magnesia was not analyzed with respect to its content of $B_2O_3$, other runs have shown a decrease in $B_2O_3$ content, by chlorination, from a starting value of about 0.2% to a final value of less than 0.1%, by weight on the ignited basis, with simultaneous decrease in iron and manganese content comparable to that of the above example. Likewise in other runs it has been noted that the lime content is appreciably reduced.

In the above example, about 0.2 pound of chlorine is added per pound of MgO, but less is effective, and more can be added but is not economical, as it has been found that 0.2 pound of chlorine per pound MgO removes about 90% of the iron and manganese ordinarily present as residual impurities in magnesia and as low as 0.1 lb. of chlorine per lb. of MgO removes a major proportion of these impurities. In other words, since 1 mol MgO requires 1 mol $Cl_2$ to form $MgCl_2$, or 1 part MgO requires 1.73 parts, by weight, $Cl_2$ for this conversion, it can be observed from the description herein that less chlorine is employed than would be required to convert a substantial portion of the MgO to chloride. It is an advantage of the purified magnesia derived from seawater and treated as shown in the example, that it has a high bulk density, which makes it particularly suitable for use in the electric furnace. Although a charge temperature of around 1100° C. is shown in the above example, charge temperatures of as low as 800° C., and as high as 1500° C., are also effective. The time of chlorination can also be varied, depending somewhat upon contamination of the starting material, final purity desired, concentration of chlorine, and other factors.

It is to be understood that the above specific description has been given for purposes of illustration only and that variations and modifications may be made therein without departing from the spirit and scope of the appended claims. The gas useful in this process in admixture with the chlorine-yielding gas is a gas or gas mixture which is inert toward magnesia or which is slightly reducing in action, including especially those set forth above that is to say, the gas or gas mixture contains at least a major proportion of an inert gas, as described hereinabove, and not more than a minor proportion of reducing agent or gas. It is to be understood that where magnesium hydroxide is present as, or in, the starting material in the present process, it is converted to magnesia in the course of heating to and at the temperatures effective in this process. The purified magnesia can be hydrated, if desired. The percentages shown are in percent by weight unless otherwise indicated.

I claim:

1. Process of purifying magnesia containing impurities including iron, manganese and boron which comprises treating said magnesia with a stream of chlorine gas in an amount sufficient to convert said impurities to chlorides but less than the amount required to convert a substantial portion of the magnesia to magnesium chloride in the presence of a slightly reducing gas mixture, at a temperature of from about 800° C. to about 1500° C., said gas mixture containing at least a major proportion of inert gas and not more than a minor proportion of a reducing gas, thereby volatilizing the major proportion of said impurities as chlorides without substantial reaction of the MgO, and recovering the treated magnesia.

2. Process as in claim 1 wherein said reducing gas is carbon monoxide.

3. Process of purifying magnesia containing impurities including iron, boron and manganese which comprises treating said magnesia with a stream of chlorine gas in an amount sufficient to convert said impurities to chlorides but less than the amount required to convert a substantial portion of the magnesia to magnesium chloride in the presence of a slightly reducing gas mixture, at a temperature of about 1100° C., said gas mixture containing at least a major proportion of inert gas and not more than a minor proportion of reducing gas, thereby volatilizing the major proportion of said impurities as chlorides without substantial reaction of the MgO, and then firing the treated magnesia under oxidizing conditions.

4. Process as in claim 3 wherein said reducing gas is carbon monoxide.

5. Process of preparing magnesia low in iron, boron and manganese which comprises treating seawater with calcined dolomite, washing the precipitated magnesium hydroxide with water, filtering, calcining the magnesium hydroxide filter cake to a medium burn magnesia, forming agglomerates of said calcined magnesia, treating said agglomerates with a stream of chlorine gas and a slightly reducing gas mixture containing a major proportion of inert gas and a minor proportion of carbon monoxide, at a temperature of about 1100° C., thereby volatilizing as chlorides the major proportion of iron, boron and manganese contained in said magnesia without substantial reaction of the MgO, and firing said treated magnesia under oxidizing conditions, said chlorine gas being added in an amount to volatilize said iron, boron and manganese as the corresponding chlorides but less than the amount required to convert a substantial portion of the magnesia to magnesium chloride.

6. In the process of purifying magnesia containing impurities including iron, manganese and boron the steps which comprise treating said magnesia with a stream of chlorine-yielding gas in an amount sufficient to convert said impurities to chlorides but insufficient to convert a substantial portion of the magnesia to magnesium chloride, at a temperature of from about 800° C. to about 1500° C., in the presence of a slightly reducing gas mixture containing a major proportion of an inert gas and a minor proportion of a reducing gas, and volatilizing the major proportion of said impurities as chlorides without substantial reaction of said magnesia.

TEYNHAM WOODWARD.

REFERENCES CITED

The following references are of record in the file of this patent:

UNITED STATES PATENTS

| Number | Name | Date |
| --- | --- | --- |
| 2,124,002 | Mastin | July 19, 1938 |
| 2,281,477 | Chesny | Apr. 28, 1942 |
| 2,354,584 | Elkington | July 25, 1944 |
| 2,355,367 | Cooper | Aug. 8, 1944 |
| 2,356,118 | Pidgeon et al. | Aug. 15, 1944 |